No. 875,217. PATENTED DEC. 31, 1907.
E. RUUD.
THERMOSTATIC VALVE OPERATING MECHANISM.
APPLICATION FILED JULY 6, 1906.
3 SHEETS—SHEET 1.
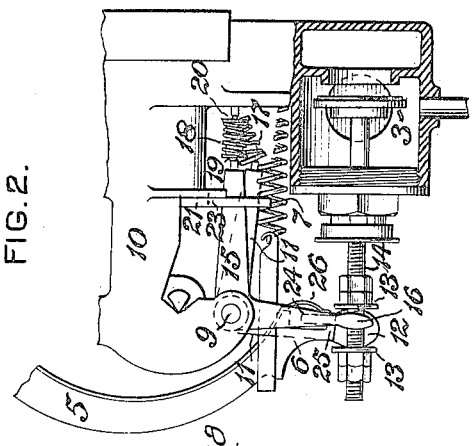
WITNESSES
INVENTOR
Att'y.

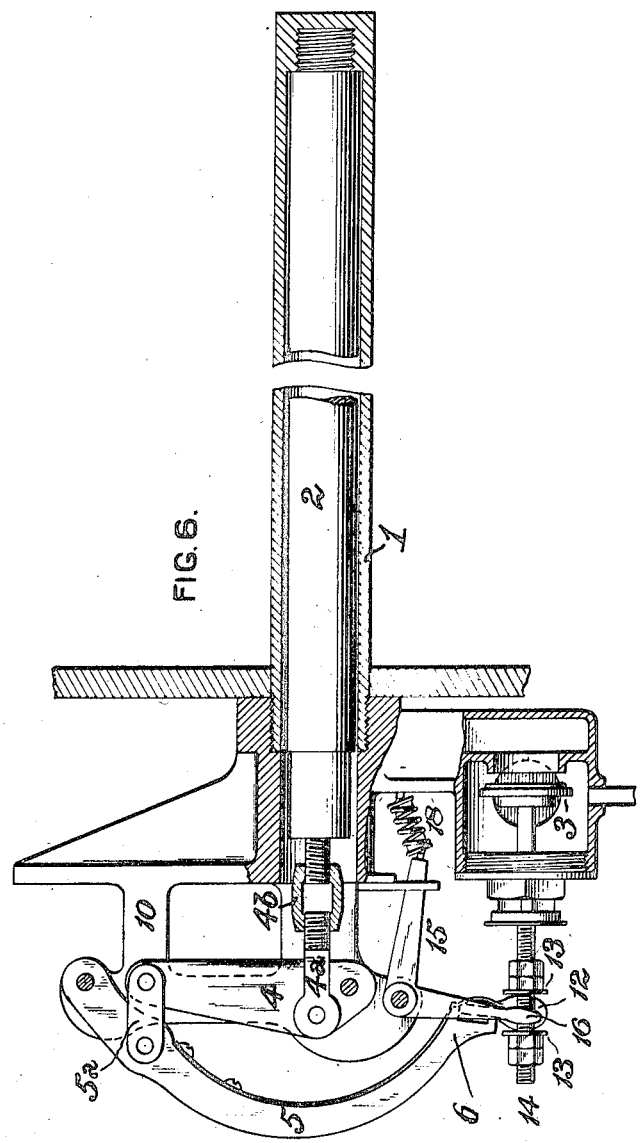

UNITED STATES PATENT OFFICE.

EDWIN RUUD, OF PITTSBURG, PENNSYLVANIA.

THERMOSTATIC-VALVE-OPERATING MECHANISM.

No. 875,217.  Specification of Letters Patent.  Patented Dec. 31, 1907.

Application filed July 6, 1906. Serial No. 324,933.

*To all whom it may concern:*

Be it known that I, EDWIN RUUD, of Pittsburg, in the county of Allegheny and State of Pennsylvania, have invented a certain new and useful Improvement in Thermostatic-Valve-Operating Mechanism, of which improvement the following is a specification.

My present invention relates more particularly to thermostatic valve operating mechanism of the class employed in automatically controlling the supply of fuel to water heaters, in the operation of which it is desirable, for efficient and economical operation, that the heat applied should be reduced or increased, as the case may be, coincidently with an increase or a diminution of the temperature of the water above or below the normal for which the thermostatic regulator has been adjusted. To this end, it has heretofore been proposed, in heaters using gaseous fuel, to transmit movement from the thermostatic regulator to the gas supply valve, through a spring and lever mechanism designed to quickly actuate the valve.

The object of my invention is to provide an actuating mechanism of the general type above indicated, in which the sudden opening and closure of the gas supply valve may be effected with greater certainty than in the prior constructions ordinarily heretofore employed.

The improvement claimed is hereinafter fully set forth.

Figure 5:
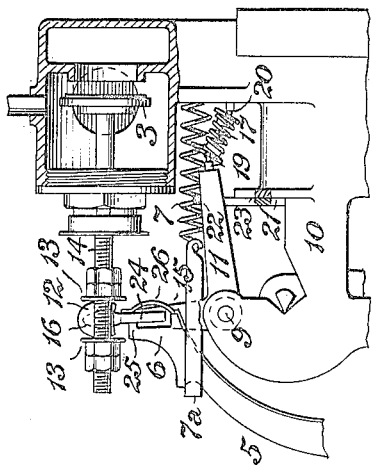
Figure 4:
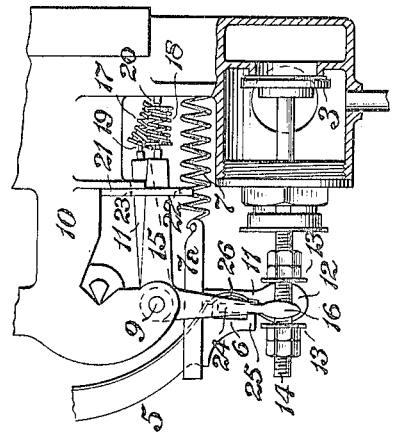
Figure 3:
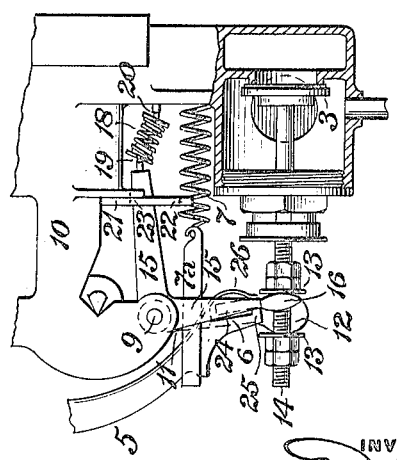

In the accompanying drawings: Figure 1 is a view, partly in elevation and partly in section, of a mechanism illustrating an embodiment of my invention, the gas supply valve being shown as fully open; Fig. 1ª is a sectional view taken on the line 1ª—1ª of Fig. 1; Fig. 2, a similar view of a portion of the same, showing the valve actuating elements in position prior to the closure of the valve and intermediate between those occupied when the valve is open and is closed, respectively; Fig. 3, a similar view, showing the parts in position when the valve is closed; Fig. 4, a similar view, showing the valve actuating elements in position prior to the opening of the valve and intermediate between those occupied when the valve is closed and is open, respectively; Fig. 5, a similar view, showing the parts in the same position as Fig. 1, but seen from the other side and upside down, relatively to the latter figure; and, Fig. 6, a view illustrating a structural modification.

The leading and essential feature of my present invention consists in the combination, with a gas supply valve and a thermostatic regulator controlling said valve, of a spring actuated lever which holds the supply valve in open and in closed position, as the case may be, and a second spring actuated lever by which the first lever is tripped between its extreme positions, the second lever being itself tripped, so as to be moved from one extreme position to another, by the action of the thermostatic regulator under variations of temperature. In operation, gradual movement of the lever which directly controls the supply valve is prevented, and complete movement of the valve from open to closed position is insured, and, further, the supply valve is prevented from creeping, or accidentally opening or closing.

In the embodiment of my invention which is herein exemplified, the thermostatic regulator proper is of a well known form, and comprises a closed tube, 1, located in the receptacle containing the liquid, the temperature of which is to be regulated, and a rod, 2, of a less degree of expansibility than the tube, 1, said rod being located in the tube, 1, and abutting against the inner end thereof, and being adapted to impart opening movement to a fuel supply valve, 3, when acted on by the contraction of the tube through the movement multiplying levers, 4 and 5, as in thermostatic regulating apparatus of similar general character heretofore known in the art. The free end, 6, of the lever, 5, is subject to the tension of a spring, 7, one end of which is coupled by a yoke, 7ª, to the lever and the other is connected to the frame structure, 10. The regulator is adjusted to act at the required temperature by one or both of the screws, 8, 8.

Two bell crank levers, 11 and 15, are pivoted by a pin or pins, 9, to the frame, 10, one of said levers, 11, being provided with an enlargement or head, 12, fitting between two collars, 13, on the stem, 14, of the supply valve, 3, on one side of said stem. The other lever, 15, carries a smaller head, 16, located at the opposite side of the valve stem, there being a certain amount of play or lost motion allowed to the head, 16, between the valve stem collars, 13. The opposite end of the levers, 11 and 15, are acted upon by springs, 17 and 18, respectively, each exerting a thrust between a ball bearing, 19, on its lever, and a similar bearing, 20, on the frame 10. The levers are held in their extreme positions by stops, 22, 23, on a fixed plate, 21. The lever 11, is not connected with the movement multiplying levers, 4 and 5, but the lever, 15, carries a wing, 24, contacting with a projection, 25, on the lever, 5, and acted upon, on its opposite face, by a plate spring, 26, fixed, near one of its ends, to the lever, 5.

In the operation of the construction above described, so long as the temperature of the liquid which is being controlled is below that at which the thermostatic regulator is adjusted to act, the several members occupy the positions shown in Fig. 1, and the supply valve, 3, is held in open position by the lever, 15, under the action of its spring, 17.

While the liquid is being raised to the temperature at which the apparatus is adjusted to cut off the fuel supply, the tube, 1, gradually expands, so as to allow movement to be imparted to the levers, 4 and 5, by the spring, 7, in the usual manner, this movement, in turn, causing the lever, 15, through its wing, 24, to be gradually advanced to the position shown in Fig. 2, in which position the bearings of the spring 18, and the adjacent arm of the lever are in line, the supply valve, 3, being meanwhile held open by the lever 11. Any continued movement of the lever, 5, resultant upon the action of the spring, 7, will cause the lever, 15, to be swung by the spring 18, so that the head, 16, rapidly advances and strikes the valve stem collar, 13, which is nearer the valve, 3. The spring, 18, is slightly stronger than the spring, 17, and the impact of the lever, 15, on the valve stem, is transmitted by the collar, 13, which is further from the valve, to the head, 12, of the lever, 11, which is thereby quickly swung and instantly closes the supply valve, 3. This position of the parts is illustrated in Fig. 3, and the valve is held in closed position by the lever, 11, as long as the liquid remains at the desired temperature.

Proportionately with the lowering of the temperature of the liquid below that at which the apparatus is adjusted to cut off the fuel supply, the tube, 1, gradually contracts, and the levers, 4 and 5, are subjected to pressure from the rod, 2, in opposition to the action of the spring, 7. During the first part of the resultant return movement of the levers, 4 and 5, the lever, 15, through its connection with the lever, 5, is moved about its pivotal axis until the centers, 9, 19, and 20, are again brought into line, as shown in Fig. 4, in which position the spring, 18, is inactive to move the lever. The head, 16, of the lever, 15, has, at this time, been brought towards the collar, 13, which is farther from the valve, and further movement of the levers, 4 and 5, will cause the lever, 15, to be moved slightly out of line with the spring, 18, so that said spring will suddenly oscillate the lever, thereby rapidly moving the head to take up the remaining lost motion and suddenly open the supply valve, 3, and in this action, to assist the spring, 17, to pass abruptly over to its opposite extreme position. The impulse is transmitted to the spring, 17, by the head, 12, of the lever, 11, which lever holds the supply valve in full open position, as shown in Figs. 1 and 5, until the above described cycle of movement is repeated. The yielding connection between the levers, 15 and 5, provided by the wing, 24, and spring, 26, permits the lever, 5, to be moved without action on the supply valve, should the temperature fall below that at which the regulator is adjusted to operate, as may happen in transit of the regulator in places of varying climate, thereby avoiding liability to damage of the regulator.

Fig. 6, illustrates a structural modification, in which the spring, 7, and yoke, 7$^a$, are dispensed with, and the thermostatic regulator acts positively on the lever mechanism in both its inward and its outward movements. In this instance, the neutral or nonexpansible rod, 2, is secured at its inner end to the expansible tube, 1, as by being screwed thereinto. The outer end of the rod, 2, is threaded, and a link, 4$^a$, which is coupled to the primary movement multiplying lever, 4, has its opposite end threaded in reverse direction to the rod, 2. The link, 4$^a$, is connected to the rod, 2, by a nut, 4$^b$, having internal right and left hand threads corresponding with the threads of the link and rod, respectively, said nut serving the further purpose of providing for temperature adjustment of the entire mechanism. The primary lever, 4, is coupled to the secondary lever, 5, by a link, 5$^a$, through which the movement of the former lever is transferred to the latter. The secondary lever, 5, is forked at its free end and engages a bell crank lever, 15, similar in construction and connections to the lever, 15, first described.

In operation, upon the elevation of temperature of the liquid, the tube, 1, expands and carries with it the rod, 2, which, in turn, moves the levers, 4 and 5. The forked end of the lever, 5, moves the bell crank lever, 15, downward until its spring, 18, has assumed a position in line with the adjacent arm and pivot of the lever, and by a slight further movement, the position of the lever will be changed so that the spring will act upon it and close the supply valve, 3, as in the instance first described. The coincident movement of the lever, 11, relatively to its spring and pivot center, will hold the supply valve closed.

The operation will be reversed as the water cools, that is to say, the tube, 1, will contract and push the rod, 2, outwardly, and this rod being positively coupled to the lever system, the secondary lever, 5, moves outwardly until the spring, 18, has been moved over the center of the pivot bearings, when it will actuate the lever, 15, and again open the supply valve. The lever, 11, will also be moved and hold the valve in open position. The spring, 18, of the bell crank lever 15, is, as in the former instance, slightly stronger than that, 17, of the lever, 11, so that the lever, 11, is compelled to follow the lever, 15, in its movements to its extreme positions.

I claim as my invention and desire to secure by Letters Patent:

1. In a water heater system, the combination of a fuel supply valve, a thermostatic regulator, means having a lost motion connection with said valve and controlled by said regulator for immediately fully opening or completely closing, respectively, the fuel supply valve, means having a positive connection with said valve and a spring acting to move said last-mentioned means in either direction, whereby it tends to hold said valve either fully open or completely closed.

2. In a water heater system, the combination of a fuel supply valve, a thermostatic regulator, snap spring mechanism, controlled by the thermostatic regulator, for immediately fully opening or completely closing, respectively, the fuel supply valve, and a second snap spring mechanism, controlled by the movements of said valve, for holding the latter in either of said positions.

3. In a water heater system, the combination of a fuel supply valve, a thermostatic regulator, a spring actuated lever, controlled by the thermostatic regulator, for immediately fully opening or completely closing, respectively, the fuel supply valve, and a spring actuated lever, controlled by the said movement of the valve, for holding the latter in open or in closed positions, respectively.

4. In a water heater system, the combination of a fuel supply valve, a thermostatic regulator, a spring actuated lever which is tripped from neutral or inoperative position by the thermostatic regulator and thereupon actuated by its spring to immediately fully open or completely close, respectively, the fuel supply valve, and a spring actuated lever which is tripped from neutral or inoperative position by the movement of the lever first specified, as effected by the thermostatic regulator and is thereupon actuated by its spring to hold the fuel supply valve in open or in closed positions, respectively.

5. In a water heater system, the combination of a fuel supply valve, a valve stem fixed thereto, a thermostatic regulator, a spring actuated lever coupled positively to the thermostatic regulator and connected loosely with the valve stem, a lever having one arm coupled positively to the valve stem, a spring arranged to act on the other arm of said lever to throw it in either direction from a central position and means to limit the movement of said lever in one direction.

6. In a water heater system, the combination of a fuel supply valve, a valve stem fixed thereto, a thermostatic regulator, a spring actuated lever coupled positively to the thermostatic regulator and connected loosely with the valve stem, a yielding resistance member forming part of the connection between the lever and the thermostatic regulator, a lever having one arm coupled positively to the valve stem, a spring arranged to act on the other arm of said lever to throw it in either direction from a central position and means to limit the movement of said lever in one direction.

7. In a water heater system, the combination of a fuel supply valve, a thermostatic regulator, a snap spring mechanism having a positive connection with the stem of said valve, a second snap spring mechanism having a lost motion connection with said stem, and a movement multiplying mechanism between the thermostatic regulator and said second snap spring mechanism.

8. In a water heater system, the combination of a fuel supply valve, a thermostatic regulator, a snap spring lever having a positive connection with the stem of said valve, a second snap spring lever having a lost motion connection with said stem, and a movement multiplying lever system connected to the thermostatic regulator and to said second snap spring lever, said last connection being normally rigid but adapted to yield under abnormal conditions.

EDWIN RUUD.

Witnesses:
  CLARENCE A. WILLIAMS,
  E. H. ROWLEY.